United States Patent [19]

Venema

[11] Patent Number: 4,893,238
[45] Date of Patent: Jan. 9, 1990

[54] TEXT PROCESSING DEVICE FOR STENOGRAPHIC TYPING

[75] Inventor: Izaäk Venema, Eindhoven, Netherlands

[73] Assignee: U.S. Philips Corporation, New York, N.Y.

[21] Appl. No.: 157,448

[22] Filed: Feb. 17, 1988

[30] Foreign Application Priority Data

Feb. 19, 1987 [NL] Netherlands .................. 8700410

[51] Int. Cl.$^4$ .................................... B41J 3/02
[52] U.S. Cl. ............................ 364/419; 400/98
[58] Field of Search ........ 364/419, 709, 900 MS File, 364/709.01, 709.02; 400/98

[56] References Cited

U.S. PATENT DOCUMENTS

| | | | |
|---|---|---|---|
| 4,339,806 | 7/1982 | Yoshida | 364/900 |
| 4,396,992 | 8/1983 | Hayashi et al. | 364/900 |
| 4,459,049 | 7/1984 | Howell et al. | 400/98 |
| 4,464,070 | 8/1984 | Hanft et al. | 400/98 |
| 4,684,926 | 8/1987 | Yong-Min | 340/365 R |
| 4,760,528 | 7/1988 | Levin | 400/98 X |

OTHER PUBLICATIONS

A. M. Fountain et al, "Programmable Function Keys for Display System", IBM Technical Disclosure Bulletin, vol. 23, No. 9, Feb. 1981, p. 4326.

S. J. P. Todd, "Abbreviated Typing for Word Processing", IBM Technical Disclosure Bulletin, vol. 21, No. 9, Feb. 1979, pp. 3796–3797.

Primary Examiner—Jerry Smith
Assistant Examiner—Steven G. Kibby
Attorney, Agent, or Firm—Bernard Franzblau

[57] ABSTRACT

A text processing device for stenographic typing comprises an alphanumerical keyboard, a translation device, a read/write memory and a display device. Given, frequently occurring words can be entered into the device in abbreviated form. Words of a main set are entered by way of a sequence of two or more key strokes. At least the first two thereof each define a word part to be separately pronounced, for example, in that they constitute the first letters of respective syllables. The full word corresponding to an abbreviated word is formed by the translation device in that at least one missing letter is inserted each time between two successively entered letters. By also providing one or more smaller auxiliary sets of abbreviations, there is an overall saving as regards the number of key strokes required to enter a text.

16 Claims, 1 Drawing Sheet

TEXT PROCESSING DEVICE FOR STENOGRAPHIC TYPING

BACKGROUND OF THE INVENTION

This invention relates to a text processing device, comprising an alphanumerical keyboard for entering letters by way of successive key strokes, a read/write memory which can be fed by the keyboard in order to store words represented by a string of letters, a display device be fed by the read/write memory in order to display in legible form a text represented by a series of words, and a translation device which is connected to the keyboard in order to apply an abbreviated word identified by a sequence of key strokes to said read/write memory in complete form by supplementing missing letters in the abbreviated word.

A device of this kind is known from U.S. Pat. No. 4,459,049. The entering of abbreviated words which can be recognized by the machine and which are subsequently represented by the corresponding complete words increases the typing speed of a typist. It is a drawback of the known technique that many abbreviations must be learned by heart. Furthermore, the abbreviations are non-systematically composed, which also makes their use more difficult.

SUMMARY OF THE INVENTION

It is an object of the invention to provide a device of the kind set forth which is easy to use and for which it essentially suffices to know those words for which an abbreviation exists, without it also being necessary to learn the abbreviations themselves. The object in accordance with the invention is achieved in that for an abbreviated word which is to be supplemented and which is identified by a sequence of at least two key strokes, which word forms part of a principal set of words, at least one missing letter is inserted each time between two successively entered letters and the relevant sequence comprises letters spatially distributed over the word in question. At least the first two letters of the sequence each define a word part to be separately pronounced, the total sequence forming a sequence which does not occur as a valid word in a standard text. The principal set of words to be abbreviated contains most words. Because these words are systematically abbreviated, very little training will be required for correct use. In a preferred embodiment at least ⅔ of the words form part of the main set. These are the words most frequently used in standard texts.

A word part may be defined in various ways. A first possibility consists in the use of the first letter of a syllable. In given cases it will be advantageous to use the last letter of a syllable. This may also depend on the language concerned. Sometimes a very short syllable can be defined by an adjacent letter of a neighbouring syllable, notably if the relevant syllable has only a phonetic and no semantic function. Preferably, the letters to be keyed are the first letters of syllables. The cited reference states some words which are replaced by the first letters of the syllables, but in accordance with the invention such an approach is used systematically. It has been found that this is much easier than the cited prior which uses a mixture of abbreviation systems. In accordance with the present invention there are only a few exceptions and for the exceptions there is also provided a systematic structure. The supplementing of missing letters in order to form a complete word can be performed under the control of a subsequently actuated space bar, or under the control of a special activation key. This key can also form the space succeeding the relevant word. Furthermore, various additional facilities can be created. For example, the cited prior art states the possibility of capitalization, underlining and representation in italics. It is also possible to form a multitude of word endings automatically or not. Furthermore, a set of standard abbreviations can be attractively supplemented by special abbreviations (for example, names of persons, authorities or complex chemical formulas) which can be separately entered by means of a separate mechanism. The natural composition of the abbreviations and the simplicity of activation of the translator device will always make the learning process easy and will simplify the use of the device also in the case of a foreign language.

BRIEF DESCRIPTION OF THE DRAWINGS

The invention will be described in detail hereinafter with reference to a table and a number of Figures. Table Ia . . . Ij lists a number of words with the associated sequence of key strokes.

DESCRIPTION OF THE TABLE OF ABBREVIATIONS

Table Ia . . . Il lists a number of words with the associated sequence of key strokes. The table has been compiled for the Dutch language. The left-hand column contains the words and the center column contains the associated abbreviations. Table Ia contains 42 words of the principal set. All these words are abbreviated in the form of a sequence of at least two letter key strokes. 19 words are abbreviated by three key strokes, 18 by four key strokes, 3 by five key strokes and 2 by six key strokes. For these words each key stroke defines a word part to be separately pronounced in that the associated letter is the first letter of a syllable. In Dutch practically all syllables are separately pronounced; moreover, in principle a line of text can be interrupted at the end of a syllable. These rules are known and reference is made to the generally known grammar. In addition to this main set, table Ia also contains the following words of auxiliary sets:

a. words which are represented by only a single key stroke ("aan"). Of this category there are substantially as many words as there are separate keys. The relevant key usually corresponds to the first letter of the relevant word;

b. words which end with the letters -ing-. These words are represented in the same way as the words of the main set, but the last syllable is represented by -i- (3 cases in table Ia);

c. the names of the days; these names are represented by a period, followed by the first two letters of the name of the day; where the period acts as a selection character;

d. the names of the months; these names are represented by a period followed by the sequence number (14 12) of the relevant month; the period again acts as a selection character;

e. a number of standard abbreviations; these abbreviations consist of the first letters of the constituent words;
f. some exceptions (the fourth case of table Ia, the twelfth case of table Ie, and some others);
g. a further exception is formed by the word -maximum-, where the -x-, being the last letter of the first syllable, defines the beginning of the second syllable.

In total, table Ia contains 11 exceptions and 42 words of the principal set. The situation is similar in the other tables. The number of words of the principal set, therefore, amounts to approximately 4/5 of the total number of words for which an abbreviated form is provided. This fraction may be higher or lower. The higher the fraction, the easier learning will be. The latter, however, also depends on the structuring of the auxiliary sets. The more systematic the auxiliary sets are, the easier the learning will be. However, sometimes flexibility of use will demand priority over a systematic approach. The main set consists of sequences which do not form valid words in standard texts. The word -alm- is actually a German word, the word -do- is a musical note, -eg- is an agricultural implement, -es- is a kind of tree, -eva- is a female first name. All of these words generally do not occur in standard texts used in an office environment. Should one or more abbreviated forms be problematic, they can be blocked by an appropriate mechanism or the relevant abbreviation can be replaced by another abbreviation.

The sets given refer to the Dutch language. Similar approaches may be used for other languages. For drafting the respective sets of words use will generally be made of a list of words most frequently used in an office environment. Such lists are usually available, together with an indication as regards frequency of occurrence. Finally, starting with the most frequently used words, the abbreviated forms are determined. For a number of very frequently occurring, usually short words, an abbreviated form is represented by a single letter. For languages in Latin writing, often this group will usually comprise approximately 25 words.

Subsequently, words which consist of two syllables or of two word parts to be separately pronounced are selected and replaced by two defining letters. This method is continued for longer words. Obviously, each abbreviated form may occur only once and, moreover, it may not correspond to a sequence which occurs as a valid word in a standard text. The definition of a word part must be systematic and in many cases the consequent use of the first letter of the syllable will be attractive. It has been found that in the case of the Dutch language a saving amounting to 25-30% of the number of key strokes required can thus be achieved. Subsequently, if necessary, a number of other abbreviated forms are added to the main set as exceptions. Subsequently, the translator device is programmed.

DESCRIPTION OF A PREFERRED EMBODIMENT OF A DEVICE IN ACCORDANCE WITH THE INVENTION

Figure 1:
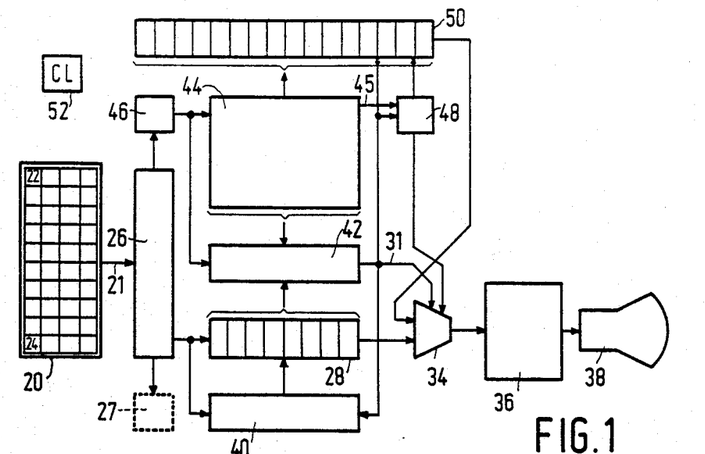
FIG. 1 shows a device in accordance with the invention.

FIG. 1 shows a block diagram of a device in accordance with the invention. Element 20 is a symbolically denoted, customarily used alphanumerical keyboard. The keyboard comprises letter keys, digit keys, punctuation marks, control keys (line shift key, etc.), and notably a space key 24. There may also be provided a special activation key 22, but such a key is not strictly necessary. Upon actuation, the information of the keys (position codes) is applied to the decoder 26 in a conventional manner via a line 21. The decoder detects whether a control key was pressed and applies a signal to the control device 27. Such a control key may indicate that the text processing program is abandoned, for example because data (tables etc.) must be entered or, conversely, that the text processing program must be activated. It may also concern a separate control such as capitalization, line shift, carriage return etc. These operations take place partly independently of the keyboard mechanism, and partly in parallel therewith. The foregoing will be described in detail hereinafter. Furthermore, the decoder 26 detects whether a space key was pressed, in which case it applies an actuation signal to the control element 46 which controls the translation operation. Furthermore, the decoder applies the character code (thus, in the above case either a character or a space) as decoded from the position code of the alphanumerical keyboard 20, to a shift register 28 and a count pulse to the control device 40. The latter then contains information indicating how many characters are stored in the shift register 28. The shift register 28 has a FIFO structure so that in the case of a given degree of filling with character codes these codes are stored in preceding register positions. The contents of the register 28 form comparison material for the comparison device 42. Together with an associated memory 44 and a shift register 50, the comparison device 42 constitutes the most important part of the translation device. For each relevant word location the associative memory 44 contains key information in the form of the character codes of the abbreviation key strokes, and as associated data the full word, or the fixed expressions of the previously cited auxiliary set e. When a space code is detected, the control device 46 successively forms all addresses of the memory 44, so that the associated key information is compared with the character codes in the shift register 28. If the control device 46 also knows the length of the series of character codes in the shift register 28, only key information having the control length need be compared. This means that the count in the control device 40 indicates which part of the contents of the memory 44 need be addressed. This accelerates the operation, but the relevant mechanism is not described in detail herein.

Alternatively, the translation device may be realized by a directly accessible memory (PLA or ROM) for which the register 28 stores the address. The latter aspect is not elaborated because the address range would usually become prohibitively large.

If no space is detected, the filling of the register 28 is continued and ultimately an overflow condition could arise. In order to prevent such a condition, at the most eight character codes (including the last space code) can be inserted in the register 28. When the register is full, the control device 40 applies a number of output shift pulses to the register 28 such that the contents thereof are applied to a multiplexer 34. This situation can be repeated in the case of a very long series of character codes without spacing, or in the case of such an overflow the shift register 28 is further controlled in a transparent mode.

In the latter case the transparent state is terminated in response to a next space, because thereafter an abbreviated form may commence again. Each space thus causes a reset operation. When a space key is actuated in a non-empty state of the shift register 28, the translation device is activated in the described manner.

The result of the translation may be two-fold. First of all, the shift register 28 may be filled with a series of letter (or possibly other) codes which do not represent an abbreviated form. In that case the translation device applies a negative activation signal on line 31, which signal thus appears when all relevant addresses of the associative memory 43 have been addressed. It may thus be formed by cooperation of the control device 46 (all addresses formed) and the comparison device 42 (comparison result negative). This can be realized by way of a dialog organization, but the means required for this purpose have been omitted for the sake of simplicity. The "negative result" signal on the line 31 activates the control device 40. The latter device then controls a shift operation in the shift register 28 so that the character codes stored therein and the adjacent space code are applied to the multiplexer 34. To this end, the multiplexer 34 is controlled so as to conduct and the information is applied to the read-write memory 36. Therein, the information is stored according to the known organization and, if necessary, is displayed on the display device 38. The latter may also be a printing device. The number of shift pulses for the shift register 28 corresponds to the number of characters contained therein, including the terminating space. The function of the elements 36, 38 is similar to that in the previously discussed overflow situation. In a different set-up, steps may be taken for also displaying the character code already temporarily stored in the register 28. This is facilitated if the element 28 is not a shift register but forms part of a random access memory. This is not indicated. The keyboard 20 may also comprise a number of control keys, for example having the following functions:

line shift key: acts with respect to the shift register 28 in the same way as the overflow situation; no transparent condition follows;

back space key: invalidates the last character code entered into the register 28. This can take place in that the control device 40 shifts a pointer bit so that subsequently the last character code entered can be erased;

capitalization key: this key is applied directly to the memory 36, together with the character code (codes) to which the capitalization relates. For the effect of this key as well as underlining keys reference is made to the cited state of the art.

Other control keys are usually included in a separate part of the keyboard which is not included within the alphanumerical section of the keyboard and are processed in known manner. It is to be noted that digits, punctuation marks and some other characters are processed in the same way as letters, but are not evaluated as letters in the comparison (except for the stated selection character). The activation key 22 can operate in the same way as the space key: the comparison is activated, but in that case no space character code is formed. This means that a word formed from an abbreviation can be expanded with a next word by concatenation. This expansion can also precede the expanded word; in that case the preceding word is terminated by activation of the activation key so that the space is suppressed.

Contrary to the foregoing, the shift register 28 may be filled with a series of letter codes (and possibly a selection character) which do represent an abbreviated word form. In that case the translation device outputs a positive actuation signal and fills an output shift register 50 with the non-abbreviated form of the relevant word and a space character coupled thereto (if the latter was present in the register 28; in the opposite case the space is omitted in the register 50). Furthermore, the register 28 is reset to zero. The activation signal then activates a shift operation in the shift register 50 so that the character codes and the adjoining space code stored therein are applied to the multiplexer 34. The multiplexer 34 is thus controlled so as to conduct and the information is processed in the described manner in the read-write memory 36 and the display device 38.

The signal "positive comparison" on the line 31 controls a load operation in the register 50 and activates the control device 48. This device also receives pointer information on line 45, indicating how many character codes have been stored in the shift register 50, so that the correct number of pulses will be issued when the shift register is unloaded. For different operations involved in the foregoing, clock pulses are supplied by the clock 52. The synchronization connections have been omitted for the sake of simplicity. When the shift register 50 has been unloaded, the control device 48 applies a reset pulse to the multiplexer 34 via the line 49. Subsequently, the multiplexer is transparent again for the information from the shift register 28. In the foregoing example the memory 44 may be suitable for storing, for example 600 abbreviations of from 1 to 6 characters which are expanded to words/word groups of from 2 to 15 characters. The associative memory 44 may have a matrix organization so that the capacity amounts to 600×21k characters. Usually the word width will be less than 21 characters, for example in that the supplemented text is stored at a plurality of successive word locations. The last word location then contains a termination bit and the word locations will be addressed until the termination bit is encountered. The invention, however, does not relate to the memory organization per se.

Figure 2:
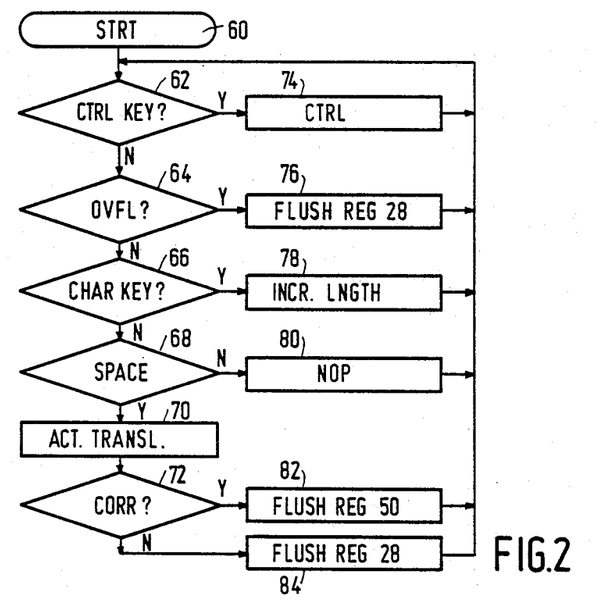
FIG. 2 shows a flowchart illustrating the operation of the device shown in FIG. 1.

FIG. 2 shows a flowchart of a device constructed essentially in accordance with FIG. 1. In block 60 the system is initialized, for example by the resetting of the registers and the counters, the entering of the text processing system, and the like. In the case of a personal computer, the text processing application may be one of many feasible applications. In block 62 it is detected whether an actuated key is a control key (not the previously mentioned activation key). Actually, a waiting loop (not shown) preceding the block 62 is provided. If a control key is detected in the block 62, the system proceeds to block 74 and the control operations are performed. In given circumstances the system may abandon the flowchart but this is not shown. If the system is to remain in the flowchart, it proceeds to block 62 again. Examples of the operation of control keys have already been described.

If a different key actuation is detected in the block 62, the system proceeds to block 64. Therein, it is detected whether an overflow condition exists. If the reply is positive (register 28 has then been filled to a given degree as has already been discussed), the system proceeds to block 76 and the contents of the register 28 are transferred to the memory 36, the system subsequently proceeding to the block 62 again. The previously described operation of the register 28 in the transparent mode and the resetting thereof in response to the next space character has been omitted for the sake of simplicity.

If no overflow condition is detected in the block 64, the system proceeds to block 66. Therein it is detected whether the most recently actuated key concerned a character (not a space character). If it does, the relevant character is stored in the shift register 28 and the pointer in the control device 40 is updated.

If no character key is detected in the block 66, the system proceeds to block 68. In the block 68 it is detected whether a space character was pressed. This will generally be the case. If no space character was pressed, the system proceeds to block 80 for a dummy operation and subsequently returns to the block 62. If a space character was pressed, the system proceeds to block 70 and the translation operation is undertaken. The space character is then also stored in the register 28. The translation operation thus requires a number of cycles, each of which involves an access into the memory 44 and a comparison attempt in the comparison device 42. It is detected in block 72 whether correspondence exists. Actually, this constitutes a waiting operation during which the above cycles are executed. When the cycles stop, two possibilities exist. When correspondence has been found, the register 50 will contain the supplemented series of character codes. In that case the contents of the register 50 are transferred to the memory 36 and the necessary reset operations are performed. The system subsequently returns to the block 62. If no correspondence has been found, the series of character codes does not concern an abbreviation. In that case the information of the register 28 is transferred to the memory 36 and the necessary reset operations are performed. The system again returns to the block 62. Thus, in the block 62 the space code and also the code of the activation key 22 do not form a control key code. The key 22 does not form a space code for the register 28, but does activate the comparison operation. Similar to the above overflow condition, the various operations upon detection of a space key/activation key have been described in simplified form.

TABLE Ia

| Dutch word | Abbreviated Dutch word | English translation |
|---|---|---|
| aan = | a | on |
| aan de hand van = | adhv | with reference to |
| Aan de heer = | adh | To Mr. |
| Aan de heren = | adhr | To Messrs. |
| aanmerkelijk = | amkl | Substantial |
| aanmerken = | amk | (to) comment |
| aanmerking = | ami | comment |
| aanmerkingen = | amkg | comments |
| aanwezig = | awz | present |
| aanwezigen = | awzg | attendants |
| aanwezigheid = | awzh | presence |
| aanzienlijk = | azl | considerable |
| aanzienlijke = | azlk | considerable |
| absoluut = | asl | absolute |
| accepteren = | actr | (to) accept |
| achter = | at | behind |
| achtereen = | ate | consecutive |
| achtereenvolgens = | atevg | successively |
| activiteit = | atvt | activity |
| activiteiten = | atvtt | activities |
| administratie = | amnst | administration |
| administratieve = | amnstv | administrative |
| afdeling = | adi | department |
| afdelingen = | adlg | departments |
| afgehandeld = | aghd | dealt with |
| afgelopen = | aglp | expired |
| afgesproken = | agsk | agreed |
| afgewezen = | agwz | rejected |
| agenda = | agd | agenda |
| akkoord = | ak | accord |
| algemeen = | agm | general |
| algemene = | agmn | general |
| allemaal = | alm | all |
| allereerst = | ale | first of all |
| allerlei = | all | variety |
| als het ware = | ahw | as if it were |

TABLE Ia-continued

| Dutch word | Abbreviated Dutch word | English translation |
|---|---|---|
| ander = | ad | other |
| andere = | adr | other |
| antwoord = | aw | reply |
| antwoorden = | awd | (to) answer |
| apparaat = | apr | apparatus |
| apparaten = | aprt | apparatus (pl.) |
| april = | .4 | April |
| arbeid = | ab | labour |
| artikel = | atk | article |
| artikelen = | atkl | articles |
| augustus = | .8 | August |
| automatiseren = | atmtsr | (to) automate |
| automatisering = | atmtsi | automation |
| beantwoord = | baw | answered |
| beantwoorden = | bawd | (to) answer |
| beantwoording = | bawi | answering |
| bedrijf = | bd | business |

TABLE Ib

| Dutch word | Abbreviation Dutch word | English translation |
|---|---|---|
| bedrijven = | bdv | (to) operate |
| behalve = | bhv | except |
| behandel = | bhd | treat |
| behandelen = | bhdl | (to) treat |
| behandeling = | bhdi | treatment |
| belang = | bl | importance |
| belangen = | blg | interests |
| belangrijk = | blr | important |
| belanrijke = | blrk | important |
| belanrijkste = | blrs | most important |
| belangstelling = | blsi | interest |
| belasting = | bli | tax |
| belastingen = | bltg | taxes |
| ben = | b | am |
| beoordelen = | bodl | (to) judge |
| beoordeling = | bodi | judgement |
| bepaalde = | bpd | given |
| berekenen = | brkn | (to) calculate |
| berekening = | brki | calculation |
| berekeningen = | brkng | calculations |
| beslissen = | bss | (to) decide |
| beslissing = | bsi | decision |
| beslissingen = | bssg | decisions |
| besluit = | bs | resolution |
| besluiten = | bst | (to) resolve |
| besproken = | bsk | discussed |
| bestuurder = | bsd | driver |
| betekende = | btkd | meant |
| betekenis = | btkn | meaning |
| betekent = | btk | means |
| betreffende = | btfd | concerning |
| bevestig = | bvt | acknowledge |
| bevestigen = | bvtg | (to) acknowledge |
| bevestiging = | bvti | acknowledgement |
| bezoek = | bz | visit |
| bezoeken = | bzk | (to) visit |
| bijvoorbeeld = | bvb | for example |
| bijzonder = | bzd | special |
| bijzondere = | bzdr | particular |
| bijzonderheden = | bzdhd | particularities |
| bijzonderheid = | bzdh | particularity |
| binnen = | bn | within |
| binnenkort = | bnk | shortly |
| boven = | bv | above |
| bovenal = | bva | above all |
| bovendien = | bvd | moreover |
| buiten = | bt | outside |
| buitenland = | btl | abroad |
| buitenlandse = | btls | foreign |
| capaciteit = | cpct | capacity |
| capaciteiten = | cpctt | capacities |
| centraal = | ct | central |
| centrale = | ctl | central |
| commercieel = | cmc | commercial |
| commerciele = | cmcl | commercial |
| commissie = | c | comission |

TABLE Ib-continued

| Dutch word | Abbreviation Dutch word | English translation |
|---|---|---|
| comunicatie = | cmnct | communication |
| computer = | cpt | computer |
| concern = | cc | concern |

TABLE Ic

| Dutch word | Abbreviation Dutch word | English translation |
|---|---|---|
| concurrent = | ccr | competitor |
| concurrentie = | ccrt | competition |
| concurreren = | ccrr | (to) compete |
| consequenties = | csqt | consequences |
| consument = | csm | consumer |
| consumenten = | csmt | consumers |
| daadwerkelijk = | dwkl | indeed |
| daaraan = | da | thereon |
| daardoor = | dd | thereby |
| daarenboven = | debv | moreover |
| daarentegen = | detg | however |
| daarin = | di | therein |
| daarmee = | dm | therewith |
| daarna = | dn | thereafter |
| daarover = | dov | thereabout |
| daartoe = | dt | thereto |
| daarvan = | dv | thereof |
| dat wil zeggen = | dwz | that is to say |
| de = | d | the |
| december = | .12 | December |
| definitief = | dfnt | definitively |
| definitieve = | dfntv | definitive |
| De heer = | dh | Mr. |
| De heren = | dhr | Messrs. |
| delen u mede = | dum | inform you |
| delen wij u mede = | dwum | we inform you |
| deze = | dz | this |
| dezelfde = | dzd | the same |
| dikwijls = | dw | often |
| dinsdag = | .di | Tuesday |
| directie = | drt | management |
| direkt = | dr | direct |
| discussie = | dcs | discussion |
| distributie = | dtbt | distribution |
| diverse = | dvs | various |
| donderdag = | .do | Thursday |
| door = | do | by |
| door middel van = | dmv | by means of |
| duidelijk = | ddl | clear |
| duidelijke = | ddlk | clear |
| duidelijkheid = | ddlh | clarity |
| economie = | ecnm | economy |
| economische = | ecnms | economical |
| een = | e | one |
| een en ander = | eea | this and that |
| een of ander = | eoa | this or that |
| eigen = | eg | own |
| eigenlijk = | egl | actual |
| einde = | ed | end |
| eindelijk = | edl | finally |
| electronica = | eltnc | electronics |
| enkel = | ek | single |
| enkele = | ekl | some |
| ernstig = | es | serious |
| ernstige = | esg | serious |
| Europa = | erp | Europe |
| even = | ev | briefly |
| evenals = | eva | like |
| eveneens = | eve | also |
| evenmin = | evm | (n)either |

TABLE Id

| Dutch word | Abbreviation Dutch word | English translation |
|---|---|---|
| eventueel = | evte | possibly |
| eventuele = | evtel | any |
| evenveel = | evv | as many |
| evenzo = | evz | also |

TABLE Id-continued

| Dutch word | Abbreviation Dutch word | English translation |
|---|---|---|
| exclusief = | ecs | exclusively |
| exclusieve = | ecsv | exclusive |
| export = | ep | export |
| exporteren = | eptr | (to) export |
| extern = | et | external |
| externe = | etn | external |
| fabricage = | fbcg | manufacturing |
| fabriek = | fb | factory |
| fabrieken = | fbk | factories |
| faktuurprijzen = | ftpz | invoice prices |
| februari = | .2 | February |
| financieel = | fnc | financial |
| financiele = | fncl | financial |
| firma = | fm | firm |
| flexibel = | fxb | flexible |
| flexibele = | fxbl | flexible |
| flexibiliteit = | fxblt | flexibility |
| funktie = | ft | function |
| Geachte heer = | gh | Dear Sir |
| Geachte mevrouw = | gm | Dear Madam |
| geantwoord = | gaw | answered |
| gebruik = | gb | use |
| gebruikelijk = | gbkl | usually |
| gebruikelijke = | gbklk | usual |
| gebruiken = | gbk | (to) use |
| gebudgetteerd = | gbgt | budgetted |
| gebudgetteerde = | gbgtd | budgetted |
| gedeeltelijk = | gdtl | partially |
| gedeeltelijke = | gdtlk | partial |
| gedurende = | gdrd | during |
| gegeven = | ggv | given |
| geholpen = | ghp | assisted |
| gelegenheden = | glghd | occasions |
| gelegenheid = | glgh | occasion |
| gelijk = | gl | equal |
| gemeenschap = | gms | community |
| gemeenschappelijk = | gmspl | common |
| gemeenschappelijke = | gmsplk | common |
| gemiddeld = | gmd | on average |
| gemiddelde = | gmdd | mean |
| genoodzaakt = | gnz | obliged |
| geoorloofd = | gol | permitted |
| gereedschap = | grs | tool |
| gereedschappen = | grsp | tools |
| geregeld = | grg | regularly |
| geschreven = | gsv | written |
| gesproken = | gsk | spoken |
| geven = | gv | (to) give |
| geweest = | gw | was |
| geweldige = | gwdg | enorous |
| geworden = | gwd | become |
| gezonden = | gzd | sent |
| gisteravond = | gtav | last night |
| gisteren = | gtr | yesterday |
| gistermiddag = | gtmd | yesterday afternoon |
| gistermorgen = | gtmg | yesterday morning |

TABLE Ie

| Dutch word | Abbreviated Dutch word | English translation |
|---|---|---|
| goedgekeurd = | ggk | approved |
| grensoverschrijdende = | govsdd | cross-border |
| groot = | g | large |
| grootste = | gs | largest |
| grootte = | gt | magnitude |
| hadden = | hd | had |
| handelen = | hdl | to) act |
| handeling = | hdi | act |
| handelingen = | hdlg | acts |
| handhaven = | hhv | maintain |
| hebben = | hb | (to) have |
| heeft = | ee | has |
| hele = | hl | whole |
| heleboel = | hlb | many |
| helemaal = | hlm | all |
| herhaal = | hh | repeat |
| herhaaldelijk = | hhdl | repeatedly |

TABLE Ie-continued

| Dutch word | Abbreviated Dutch word | English translation |
|---|---|---|
| herhalen = | hhl | (to) repeat |
| herhaling = | hhi | repetition |
| het = | h | it |
| hetzelfde = | hzd | the same |
| hierover = | hov | about this |
| hij = | y | he |
| hoofdzaak = | hz | main issue |
| hoofdzakelijk = | hzkl | mainly |
| hoofdzaken = | hzk | main issues |
| Hoogachtend, = | hat | Yours faithfully |
| Hoogachting, = | hai | esteem |
| ieder = | id | each |
| iedere = | idr | every |
| iedereen = | ide | everyone |
| immers = | im | because |
| in antwoodd op = | iao | in reply to |
| inclusief = | ics | including |
| in de loop van = | idlv | in the course of |
| indirekten = | idrt | indirect personnel |
| industrie = | idt | industry |
| industrieen = | idte | industries |
| industriele = | idtel | industrial |
| informatie = | ifmt | information |
| informatieve = | ifmtv | informative |
| ingelicht = | igl | informed |
| ingericht = | igr | suitable for |
| in het algemeen = | iha | generally |
| inhoud = | ih | content |
| inkopen = | ikp | purchase |
| inlichten = | ilt | (to) inform |
| inlichting = | ili | information |
| inlichtingen = | iltg | information |
| inmiddels = | imd | meanwhile |
| in plaats van = | ipv | instead of |
| inrichten = | irt | install |
| inrichting = | iri | installation |
| inrichtingen = | irtg | installations |
| interessant = | itrs | interesting |
| interessante = | itrst | interesting |
| intern = | it | internal |
| internationaal = | itntn | international |
| internationale = | itntnl | international |
| intrne = | itn | internal |

TABLE If

| Dutch word | Abbreviated Dutch word | Enlish translation |
|---|---|---|
| inventarisatie = | ivtrst | (to) take inventory |
| in verband daarmee = | ivd | in connection therewith |
| in verband hiermee = | ivh | in connection herewith |
| in verband met = | ivm | in connection with |
| in verband waarmee = | ivw | in connection with which |
| investeren = | ivtr | (to) invest |
| investering = | ivti | investment |
| investeringen = | ivtrg | investments |
| is = | i | is |
| jaar = | j | year |
| januari = | .1 | January |
| jaren = | jr | years |
| juli = | .7 | July |
| juni = | .6 | June |
| kan = | k | can |
| konden = | kd | could |
| konsekwenties = | kskt | consequences |
| kosten = | kt | costs |
| kunnen = | kn | can |
| kwaliteit = | klt | quality |
| kwamen = | km | came |
| laat = | l | late |
| laatste = | ls | last |
| laten = | lt | leave |
| lettergreep = | ltg | syllable |
| leveren = | lvr | (to) deliver |
| levering = | lvi | delivery |
| leveringen = | lvrg | deliveries |
| maandag = | .ma | Monday |

TABLE If-continued

| Dutch word | Abbreviated Dutch word | Enlish translation |
|---|---|---|
| maar = | mr | but |
| maart = | .3 | March |
| maatregel = | mrg | measure |
| maatregelen = | mrgl | measures |
| maximum = | mxm | maximum |
| mededelen = | mddl | (to) inform |
| mededeling = | mddi | message |
| mededelingen = | mddlg | messages |
| medewerkers = | mdwk | employees |
| medewerking = | mdwi | cooperation |
| medewerksters = | mdws | female employees |
| mei = | .5 | May |
| met = | m | with |
| met andere woorden = | maw | in other words |
| met betrekking tot = | mbt | in respect of |
| Met de meeste hoogachtinh, = | mdmh | Yours faithfully |
| met het oog op = | mhoo | in vie of |
| met ingang van = | miv | as from |
| met medewerking van = | mmv | with the cooperation of |
| met referte aan = | mra | referring to |
| Met vriendelijke groet = | mvg | kind regards |
| mevrouw = | mv | Mrs. |
| middel = | md | means |
| middelen = | mdl | means |
| miljoen = | mj | million |
| miljoenen = | mjn | millions |
| minium = | mnm | minimum |
| misschien = | ms | maybe |
| moet = | oe | must |
| moeten = | mt | must |
| mogelijk = | mgl | possible |

TABLE Ig

| Dutch word | Abbreviated Dutch word | English translation |
|---|---|---|
| moelijkheden = | mglhd | possibilities |
| moelijkheid = | mglh | possibility |
| mogen = | mg | may |
| moment = | mm | moment |
| momenteel = | mmt | now |
| morgenavond = | mgav | tomorrow evening |
| morgenmiddag = | mgmd | tomorrow afternoon |
| morgenochtend = | mgot | tomorrow morning |
| naar = | n | to |
| naar aanleiding daarvan = | nad | with reference to |
| naar aanleiding hiervan = | nah | with reference to |
| naar aanleiding van = naar aanleidin waarvan = | nav naw | with reference to with reference to |
| nadeel = | nd | drawback |
| namelijk = | nml | because |
| nationaal = | ntn | national |
| nationale = | ntnl | national |
| natuurlijk = | ntl | of course |
| Nederland = | ndl | the Netherlands |
| Nederlandse = | ndls | Dutch |
| niemand = | nm | nobody |
| niet = | nt | not |
| niet van toepassing = | nvt | not applicable |
| nieuwe = | nw | new |
| noodzaak = | nz | necessity |
| noodzakelijk = | nzkl | necessary |
| noodzakelijke = | nzklk | necessary |
| noodzaken = | nzk | (to) necessitate |
| november = | .11 | November |
| ogenblik = | ogb | instant |
| ogenblikkelijk = | ogbkl | immediately |
| ogenblikken = | ogbk | instants |
| oktober = | .10 | October |
| omstandigheden = | osdhd | circumstances |
| omstandigheid = | osdh | circumstance |
| onder = | od | under |
| onderdeel = | odd | part |

TABLE Ig-continued

| Dutch word | Abbreviated Dutch word | English translation |
|---|---|---|
| onderdelen = | oddl | parts |
| onderhoud = | odh | maintenance |
| onder leidin van = | olv | lead by |
| onderneming = | odni | enterprise |
| ondernemingen = | odnm | enterprises |
| onderwerp = | odw | subject |
| onderwerpen = | odwp | subject |
| onderzoek = | odz | examination |
| onderzoeken = | odzk | examinations |
| ongeveer = | ogv | about |
| onmiddellijk = | omdl | imediately |
| onmiddellijke = | omdlk | immediate |
| onmgoelijk = | omgl | impossible |
| onmoelijke = | omglk | impossible |
| ons = | o | us |
| ontmoeten = | omt | (to) meet |
| ontvangen = | ov | (to) receive |
| ontwikkeling = | owki | development |
| ontwikkelingen = | owklg | developments |
| onvoorziene omstandigheden voorbehouden = | oov | barring unforeseen circumstances |
| onze = | oz | our |
| oordelen = | odl | (to) judge |
| openbaar = | opb | public |

TABLE Ih

| Dutch word | Abbreviated Dutch word | English translation |
|---|---|---|
| openbare = | opbr | public |
| openlijk = | opl | openly |
| openlijke = | oplk | open |
| opleiding = | oli | training |
| opleidingen = | oldg | training |
| opmerkelijk = | omkl | remarkable |
| opmerkelijke = | omklk | remarkable |
| opmerking = | omi | remark |
| opmerkingen = | omkg | remarks |
| organisatie = | ognst | organization |
| organisatorisch = | ognstr | organizational |
| organisatorische = | ognstrs | organizational |
| over = | ov | over |
| overal = | ova | everywhere |
| overeenkomst = | ovek | agreement |
| overeenkomstig = | oveks | in accordance with |
| overheid = | ovh | the authorities |
| over het algemeen = | oha | generally |
| overleg = | ovl | consultation |
| pagina = | pgn | page |
| percentage = | pctg | percentage |
| periode = | prod | period |
| per omgaande = | po | by return of mail |
| peronal computer = | pc | personal computer |
| personeel = | psn | personnel |
| personeeldienst = | psnd | personnel department |
| personeelzaken = | psnz | personnel service |
| plaats = | p | place |
| plaatsen = | ps | (to) place |
| plaatsgevonden = | pgvd | taken place |
| plaatsgvervaner = | pvvg | substitute |
| positie = | pst | position |
| prijzen = | pz | prices |
| principe = | pcp | principle |
| probleem = | pb | problem |
| problematiek = | pbmt | problems |
| problemen = | pbm | problems |
| produkt = | pd | product |
| produkten = | pdt | products |
| produktiviteit = | pdtvt | productivity |
| programma = | pgm | program |
| programmeren = | pgmr | (to) program |
| programmering = | pgmi | programming |
| publicatie = | pbct | publication |
| punten = | pt | points |
| Raad van Bestuur = | rvb | board of management |
| rapport = | rp | report |
| rapportage = | rptg | report |
| rapporten = | rpt | reports |

TABLE Ih-continued

| Dutch word | Abbreviated Dutch word | English translation |
|---|---|---|
| rapporteren = | rptr | (to) report |
| reeds = | r | already |
| referte = | rft | reference |
| regel = | rg | rule |
| regelen = | rgl | (to) control |
| regeling = | rgi | rule |
| regelingen = | rglg | rules |
| regelmatig = | rgmt | regularly |
| rekenen = | rkn | (to) calculate |
| rekening = | rki | bill |
| rekeningen = | rkng | bills |

TABLE Ii

| Dutch Word | Abbreviated Dutch word | English translation |
|---|---|---|
| relatie = | rlt | relation |
| reorganisatie = | rognst | reorganization |
| reorganiseren = | rognsr | (to) reorganize |
| respectievelijk = | rptvl | respectively |
| resultant = | rst | result |
| resultaten = | rstt | results |
| risico = | rsc | risk |
| samenwerken = | smwk | (to) cooperate |
| schriftelijk = | stl | in writing |
| schriftelijke = | stlk | written |
| schrijven = | sv | (to) write |
| secretaresse = | sctrs | secretary |
| secretaris = | sctr | secretary |
| sedert = | sd | since |
| september = | .9 | September |
| situatie = | stat | situation |
| speciaal = | sca | special |
| speciale = | scal | special |
| specialist = | scl | specialist |
| specialisten = | sclt | specialists |
| spreken = | sk | (to) speak |
| steeds = | s | always |
| structureel = | str | structurally |
| structurele = | strl | structual |
| structureren = | strr | (to) structure |
| structuur = | st | structure |
| succes = | sc | success |
| successen = | scs | successes |
| technisch = | tn | technically |
| technische = | tns | technical |
| technologie = | tnlg | technology |
| technologieen = | tnlge | technologies |
| technologische = | tnlgs | technological |
| tegelijkertijd = | tglkt | simultaneously |
| tegemoet = | tgm | forward |
| tegemoetziende = | tgmzd | looking forward to |
| tegen = | tg | against |
| tegenover = | tgov | opposite |
| telefonisch = | tlfn | by telephone |
| telefoon = | tlf | telephone |
| ten aanzien van = | tav | in respect of |
| ten behoeve van = | tbv | due to |
| ten gevolge van = | tgv | due to |
| ten name van = | tnv | in the name of |
| ten opzichte van = | tov | with respect to |
| terminal = | tmn | terminal |
| terug = | tr | back |
| terwijl = | tw | while |
| te zijner tijd = | tzt | in due time |
| tijdelijk = | tdl | temporarily |
| tijdelijke = | tdlk | temporary |
| tijdens = | td | during |
| toelichten = | tlt | elucidate |
| toelichting = | tli | elucidation |
| tot = | t | until |
| totaal = | tt | total |
| totale = | ttl | total |
| totaliteit = | ttlt | totality |
| tussen = | ts | between |
| twijfel = | tf | doubt |

TABLE I

| Dutch word | Abbreviated Dutch word | English translation |
|---|---|---|
| twijfelen = | tfl | (to) doubt |
| uit = | u | out |
| uiteindelijk = | uedl | ultimately |
| uiterlijk = | utl | no later than |
| uitverkoop = | uvk | sale |
| uitzondering = | uzdi | exception |
| van = | v | of |
| vanaf = | va | as from |
| vandaag = | vd | today |
| verandering = | vadi | change |
| veranderingen = | vadrg | changes |
| verantwoord = | vaw | justified |
| verantwoordelijk = | vawdl | responsible |
| verantwoordelijkheid = | vawdlh | responsibility |
| verantwoordelijkheden = | vawdlhd | responsibilities |
| verantwoording = | vawi | justification |
| verbeterde = | vbtd | improved |
| verbeteren = | vbtr | (to) improve |
| verbetering = | vbti | improvement |
| verbeteringen = | vbtrg | improvements |
| verbeteringsplannen = | vbtrpn | plans for improvement |
| verblijven = | vbv | remain |
| vereniging = | veni | club |
| vergaderen = | vgdr | (to) meet |
| vergadering = | vgdi | meeting |
| vergaderingen = | vgdrg | meetings |
| vergeleken = | vglk | compared with |
| vergelijk = | vgl | settlement |
| verhoging = | vhi | increase |
| verhogingen = | vhgg | increases |
| verhoudingen = | vhdg | ratios |
| verkoop = | vk | sale |
| verkopen = | vkp | (to) sell |
| verkorten = | vkt | (to) reduce |
| verlaging = | vli | (to) lower |
| verlagingen = | vlgg | reductions |
| vernieuwen = | vnw | (to) renew |
| vernieuwing = | vni | renewal |
| vernieuwingen = | vnwg | renewals |
| veroordeel = | vod | indictment |
| veroordelen = | vodl | to indict |
| verschillen = | vsl | differences |
| verschillende = | vsld | different |
| verslag = | vs | report |
| verslagen = | vsg | reports |
| vertrek = | vt | departure |
| vertrekken = | vtk | (to) depart |
| vertrouwen = | vtw | faith |
| vertrouwende = | vtwd | trusting |
| vervallen = | vvl | cancelled |
| vervangen = | vvg | (to) replace |
| vervanging = | vvi | replacement |
| verwacht = | vw | expected |
| verwachten = | vwt | (to) expect |
| verwachting = | vwi | expectation |
| verzekerd = | vzk | insured |
| verzekerde = | vzkd | insured person |
| verzekeren = | vzkr | (to) insure |
| verzekering = | vzki | insurance |
| verzenden = | vzd | (to) send |

TABLE Ik

| Dutch word | Abbreviated Dutch word | English translation |
|---|---|---|
| verzending = | vzi | shipment |
| verzoek = | vz | request |
| verzoeken = | vzk | request |
| vestiging = | vti | establishment |
| vestigingen = | vtgg | establishments |
| voldoende = | vdd | sufficient |
| volgende = | vgd | next |
| volgens = | v | according to |
| volkomen = | vkm | perfect |
| voor = | vo | for |
| voorbeeld = | vb | example |
| voorbeelden = | vbd | examples |
| voordelig = | vdl | advantageously |

TABLE Ik-continued

| Dutch word | Abbreviated Dutch word | English translation |
|---|---|---|
| voordelige = | vdlg | advantageous |
| voorlopig = | vlp | temporatily |
| voornamelijk = | vnml | mainly |
| voorraden = | vrd | stores |
| voorwaarde = | vwd | condition |
| voorwaardelijk = | vwdl | conditional |
| voor wat betreft = | vwb | as regards |
| voorzitter = | vzt | chairman |
| vorig = | vr | previous |
| vorige = | vrg | previous |
| vrijdag = | .vr | Friday |
| waaraan = | wa | whereto |
| waarbij = | wb | whereby |
| waarin = | wi | wherein |
| waarmee = | wm | whereby |
| waarom = | wo | why |
| waarover = | wov | about which |
| waarschijnlijk = | wsl | probably |
| waartegen = | wtg | whereagainst |
| waaruit = | wu | wherefrom |
| waarvan = | wv | whereof |
| wanneer = | wn | when |
| waren = | wr | were |
| werkelijk = | wkl | really |
| werkelijke = | wklk | real |
| werkelijkheid = | wklh | reality |
| werken = | wk | (to) work |
| werkgelegenheid = | wglgh | employment |
| werkgever = | wgv | employer |
| werkloosheid = | wlh | unemployent |
| werknemer = | wnm | employee |
| Wij delen u mede = | wdum | We inform you |
| wijzen = | wz | (to) change |
| wijziging = | wzi | change |
| wijzigingen = | wzgg | changes |
| willen = | wl | wish |
| woensdag = | .wo | Wednesday |
| worden = | wd | (to) become |
| wordt = | w | becomes |
| zal = | z | will |
| zaterdag = | .za | Saturday |
| Zeer geachte heer = | zgh | Dear Sir |
| zeker = | zk | certain |
| zekerheid = | zkh | certainty |
| zelfstandig = | zsd | independent |
| zeflstandigheid = | zsdh | independence |
| ziekte = | zt | illness |

TABLE II

| Dutch word | Abbreviated Dutch word | English translation |
|---|---|---|
| ziekteverzuim = | ztvz | absentecism |
| zo goed als nieuw = | zgan | as good as new |
| zo goed mogelijk = | zgm | as well as possible |
| zondag = | .zo | Sunday |
| zonder = | zd | without |
| zo spoedig mogelijk = | zsm | as soon as possible |
| zullen = | zl | shall |

What is claimed is:

1. A text processing device comprising:
input means for entering into the text processing device alphabetic information in the form of complete words or as abbreviated words defined by one or more syllabic word parts of given individual complete words of said alphabetic information,
a display device for displaying in legible form a text represented by a series of words,
a read/write memory for storing words represented by a sequence of letters and having an output coupled to an input of said display device, and
a translation device coupled to said input means and to said read/write memory thereby to apply an abbreviated word identified by a sequence of keystrokes to said read/write memory in a complete form by supplementing missing letters, said translation device comprising;

means for storing a plurality of abbreviated words made up of syllabic word parts corresponding to said syllabic word parts of said abbreviated input words, said plurality of stored abbreviated words made up of syllabic word parts comprising a majority of the words to be processed by the text processing device, and wherein each sequence of letters of an abbreviated word does not occur as a valid word in a standard text, a control device coupled to said input means for detecting a received control signal indicative of the reception of an abbreviated word, means controlled by said control device and responsive to abbreviated words received by said input means and to abbreviated words stored in said storing means for determining coincidence thereof and, upon coincidence, supplementing one or more missing letters between successive letters of said abbreviated words to form a complete word corresponding to said abbreviated word, a storage device controlled by said coincidence determining means for storing said complete word which corresponds to the abbreviated word, and means for selectively transferring a complete word in said storage device to said read/write memory.

2. A text processing device as claimed in claim 1 wherein said input means are adapted for connection to a keyboard for entering letters into said text processing device via successive keystrokes of the keyboard, wherein for an abbreviated word, of a principal set of words, comprising a sequence of at least two keystrokes, said coincidence determining and supplementing means inserts at least one missing letter between two successively entered letters.

3. A text processing device as claimed in claim 2 wherein for a word of the principal set of words identified by a sequence of at least three key strokes, at least one missing letter is inserted each time by said coincidence determining and supplementing means between two successively entered letters and the relevant sequence contains letters spatially distributed over the word in question.

4. A text processing device as claimed in claim 2 wherein said sequence of key strokes successively comprises at least two initial letters of syllables.

5. A text processing device as claimed in claim 4, wherein said sequence of key strokes is further supplemented by at least one key stroke identifying the form of an ending.

6. A text processing device as claimed in claim 2, wherein said control device activates said translation device by a space stroke immediately following said sequence.

7. A text processing device as claimed in claim 2, wherein said control device activates said translation device by an activation key stroke which directly succeeds the sequence.

8. A text processing device as claimed in claim 2, wherein individual multi-letter words are assigned to substantially all separate letter keys.

9. A text processing device as claimed in claim 2, wherein given series of words are associated with a predetermined number of sequences of key strokes, the letters indicated by the key strokes forming the first letters of the series of words, the relevant total sequence forming a sequence which does not occur as a valid word in a standard text.

10. A text processing device as claimed in claim 2, wherein days of the week are represented by a selection mark and a dyad of key strokes.

11. A text processing device as claimed in claim 2, wherein months of the year are represented by a selection mark and a month sequence number within the year.

12. A text processing device as claimed in claim 2, wherein the control device is responsive to an inadmissible sequence of key strokes to control the translation device to remain de-activated so that the sequence of letters is applied to the read/write memory in unmodified form.

13. A method of entering an alphabetic text into a computer using abbreviated word forms and translating the abbreviated word forms into their corresponding complete word forms comprising:

for a majority of words, entering into the computer a sequence of alphabetic characters comprising less than all of the characters in said words, said sequence comprising an abbreviated word form including the first letter of each syllable of the corresponding complete word, comparing each said abbreviated word form with a stored dictionary of corresponding abbreviated word forms and when a match is established, translating said abbreviated word form into its corresponding complete word form by inserting one or more missing letters between each two successive letters of the abbreviated word form, and storing, at least temporarily, in said computer the complete words corresponding to matched abbreviated words.

14. A method as claimed in claim 13 wherein said alphabetic text is entered by means of a keyboard wherein at least the first two letters of the sequence comprise letters spatially distributed over the word where each of said first two letters define a word part to be separately pronounced, and wherein each sequence of letters forming an abbreviated word form does not occur as a valid word in a standard text of words.

15. A method as claimed in claim 13 wherein said translating step is performed by a translation device in said computer, said method further comprising, prior to said translating step, activating said translation device in response to a space stroke signal which immediately follows said sequence of characters in abbreviated word form.

16. A method as claimed in claim 13 wherein, for a minority of words of said alphabetic text, the method further comprises entering complete word forms into the computer and, if a match is not established during said comparing step, said translating and storing steps are bypassed, and applying the entire sequence of letters of said complete word forms to a memory device in said computer.

* * * * *